United States Patent [19]
Braun et al.

[11] Patent Number: 6,125,552
[45] Date of Patent: Oct. 3, 2000

[54] SIDE DISCHARGE ASSEMBLY FOR A FLUID BED PROCESSING SYSTEM AND METHOD THEREOF

[75] Inventors: Ryszard Braun, Rochester, N.Y.; Antti Kosola, Kirkonummi; Iiro Uskonen, Tammisaari, both of Finland

[73] Assignee: Genencor International, Inc., Palo Alto, Calif.

[21] Appl. No.: 09/213,638

[22] Filed: Dec. 17, 1998

[51] Int. Cl.[7] .................................................. F26B 3/00
[52] U.S. Cl. .......................... 34/329; 34/576; 432/58; 432/15
[58] Field of Search .................. 34/329, 359, 360, 34/576, 583; 406/122, 130–133, 128, 180; 222/185, 195, 90, 91, 122, 146; 122/4 D; 432/58, 15; 110/245

[56] References Cited

U.S. PATENT DOCUMENTS

| | | |
|---|---|---|
| 3,253,750 | 5/1966 | Paton . |
| 3,743,539 | 7/1973 | Kroyer et al. . |
| 4,045,005 | 8/1977 | Davis et al. . |
| 4,203,689 | 5/1980 | Kraxner et al. ............................ 432/58 |
| 4,320,089 | 3/1982 | Huttlin ..................................... 432/58 |
| 4,338,878 | 7/1982 | Mason et al. . |
| 4,353,668 | 10/1982 | Anderson . |
| 4,354,450 | 10/1982 | Nagahama et al. . |
| 4,439,072 | 3/1984 | Goedken . |
| 5,009,508 | 4/1991 | Wojdylo . |
| 5,096,096 | 3/1992 | Calaunan . |
| 5,115,578 | 5/1992 | Basten . |

*Primary Examiner*—James C. Yeung
*Attorney, Agent, or Firm*—Kilyk & Bowersox, P.L.L.C.

[57] ABSTRACT

A fluid bed processing system in accordance with one embodiment of the present invention includes a product chamber, a fluid supply system, and a discharge gate. The product chamber has an open top and an open bottom and the fluid supply system has an outlet positioned to direct a first fluid into the product chamber. The outlet of the fluid supply system is spaced from the open bottom of the product chamber to define a discharge opening which extends substantially around the open bottom of the product chamber and the outlet of the fluid supply system. The discharge gate is movable to a first position covering the discharge opening and to a second position exposing the discharge opening.

22 Claims, 5 Drawing Sheets

SIDE DISCHARGE ASSEMBLY FOR A FLUID BED PROCESSING SYSTEM AND METHOD THEREOF

FIELD OF THE INVENTION

This invention relates generally to a fluid bed processing system and, more particularly, to a side discharge assembly for a fluid bed processing system.

BACKGROUND OF THE INVENTION

Fluid bed processing systems and methods can be used in a variety of different applications. For example, fluid bed processing systems and methods can be used to dry wet particles for further processing or discharge. Fluid bed processing systems and methods can also be used to coat particles by building identifiable layers evenly over an identified core. Further, fluid bed processing systems and methods can be used to granulate particles into larger aggregates in which the original particles can still be identified in the aggregates.

In fluid bed processing systems and methods, particles to be processed are loaded into a product chamber and are then fluidized into an expansion chamber. If the particles are going to be coated or granulated, a solution is sprayed onto the particles. With the solution, either layers are coated on the particles or the particles begin to aggregate together to form larger particles. The particles dry as they descend down in the expansion chamber and then are blown back up. This up and down process continues until the processing is completed and then the particles are discharged from the product chamber. Different systems and methods have been developed to discharge particles, but each has its own limitations.

For example, some systems, such as the one disclosed in U.S. Pat. No. 4,354,450 to Nagahama et al., which is herein incorporated by reference, use a discharge tube adjacent a lower end of the fluid bed processing system. Although these discharge tubes work, the outlet passages they provide are too small to quickly remove particles from the container of the fluid bed processing system. As a result, the increased time required for discharging the particles decreases the overall production throughput of the fluid bed processing system. The small size for these discharge tubes also makes them more prone to clogging and thus leads to even more down time.

Other systems, such as the one disclosed in U.S. Pat. No. 5,115,578 to Basten which is herein incorporated by reference, have a blower system with a bottom fluidizing screen which is seated against a bottom opening of a container. The bottom screen supports product in the container and can be lowered away from the bottom to permit discharge of the product. Although this system works, it has a number of drawbacks. For example, the weight of the product resting on the bottom screen can be quite large. As a result, these systems need large and expensive lift assemblies to be able to raise and lower the bottom screen and blower away from the container. These weight concerns limit the amount of product which can be loaded into the container for fluid bed processing and thus limit overall production throughput. Another problem is that due to the large weight on the bottom screen over time it may become misaligned with the opening in the bottom of the container resulting in unwanted seepage and jamming.

SUMMARY OF THE INVENTION

A fluid bed processing system in accordance with one embodiment of the present invention includes a product chamber, a fluid supply system, and a discharge gate. The product chamber has an open top and an open bottom and the fluid supply system has an outlet positioned to direct a first fluid into the product chamber. The outlet of the fluid supply system is spaced from the open bottom of the product chamber to define a discharge opening which extends substantially around the open bottom of the product chamber and the outlet of the fluid supply system. The discharge gate is movable to a first position covering the discharge opening and to a second position exposing the discharge opening.

A fluid bed processing system in accordance with another embodiment of the resent invention includes a product chamber and a discharge gate. The product chamber as an open top, an open bottom, and at least one discharge opening adjacent the open bottom which extends substantially around the product chamber. The discharge gate is movable to a first position covering the discharge opening and to a second position towards the open top of the product chamber which exposes the discharge opening.

A method for fluid bed processing of particles in a product chamber with an open top and an open bottom and a fluid supply system with an outlet positioned to direct a fluid into the product chamber in accordance with another embodiment of the present invention includes several steps. First, a discharge gate is moved to a first position to cover a discharge opening which extends substantially around and between the open bottom of the product chamber and the outlet of the fluid supply system. Next, the particles are processed and then the discharge gate is moved to a second position to expose the discharge opening and to permit discharge of the particles from the product chamber.

A method for fluid bed processing of particles in a product chamber with an open top and an open bottom and a fluid supply system with an outlet positioned to direct a fluid into the product chamber in accordance with another embodiment of the present invention also includes several steps. First, a discharge gate is moved to a first position to cover a discharge opening which is located in and which extends substantially around the product chamber. Next, the particles are processed and then the discharge gate is moved to a second position to expose the discharge opening and to permit discharge of the particles from the product chamber.

The present invention provides a number of advantages including providing a quick and easy way to discharge particles from the product chamber. The discharge opening is sufficiently large so that it rarely if ever gets clogged. Additionally, with the larger discharge opening the overall production throughput of the fluid bed processing system is improved because the product chamber can quickly and easily discharge the particles and be refilled to process more particles. Further, the discharge gate is simple and inexpensive to install and with less weight pressing on the discharge gate, it is less likely to jam.

DETAILED DESCRIPTION

Figure 1:
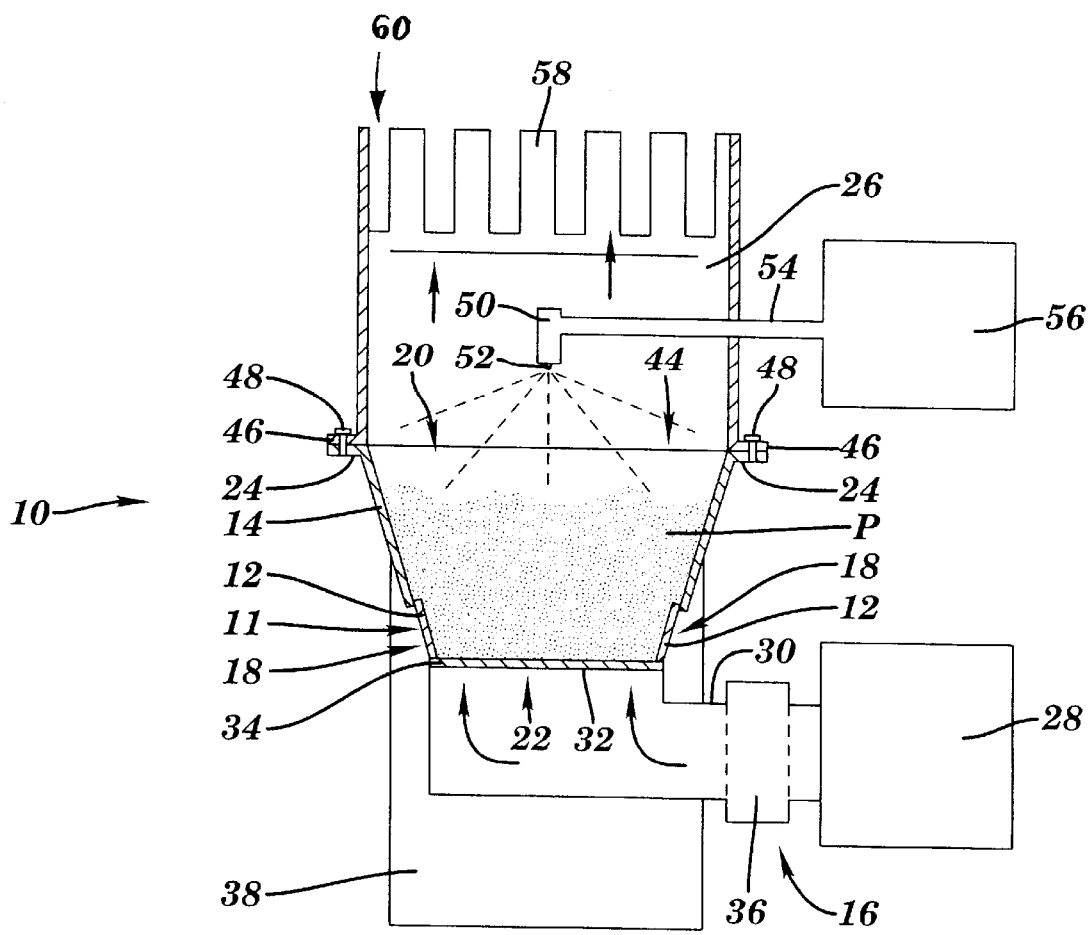
FIG. 1 is a cross-sectional, side view of a fluid bed processing system in accordance with one embodiment of the present invention.

A fluid bed processing system 10, such as a coater, granulator, or dryer, with a side discharge assembly 11 in accordance with one embodiment of the present invention is illustrated in FIG. 1. The fluid bed processing system 10 includes a product chamber 14, a fluid supply system 16, a discharge opening 18, and the discharge gate 12. The present invention provides a number of advantages including providing a quick and easy way to discharge particles from the product chamber 14, increasing the overall production throughput of the fluid bed processing system 10, and providing a side discharge assembly 11 which is simple and inexpensive to install and is unlikely to get misaligned during use.

Referring to FIGS. 1, 2A, 2B, 3, and 4A, the product chamber 14 has an open top 20 and an open bottom 22 and is used to retain the particles P which have been processed in the fluid bed processing system 10. Processing of the particles can include coating, granulation, or drying. In this particular embodiment the product chamber 14 has a funnel shape which slopes down and inward from the open top 20, although the product chamber 14 could have other shapes, such as a partial pyramid shape, and could be straight or sloped in other directions from the open top 20 to open bottom 22 as needed or desired. A flange 24 extends out from the product chamber 14 adjacent the open top 20 and is used to secure the product chamber 14 to the expansion chamber, although other types of connectors can be used.

Referring to FIG. 1, the fluid supply system 16 includes a blower 28 and a duct 30 with an outlet 32 which is positioned to direct fluid into the product chamber 14 through the open bottom 22 in the direction shown by the arrows in FIG. 1. In this particular embodiment, a screen 34 is connected to the duct 30 across the outlet 32, although the screen 34 could be connected elsewhere, such as to the product chamber 14 across the open bottom opening 22. The screen 34 has a suitable mesh size to support the particles P. The fluid supply system 16 may also include a heater 36 which is used to heat the fluid to a suitable temperature for processing the particles P. In this particular embodiment, the fluid being supplied by the fluid supply system is air, although other types of fluid can be used as needed or desired.

Figure 2A:
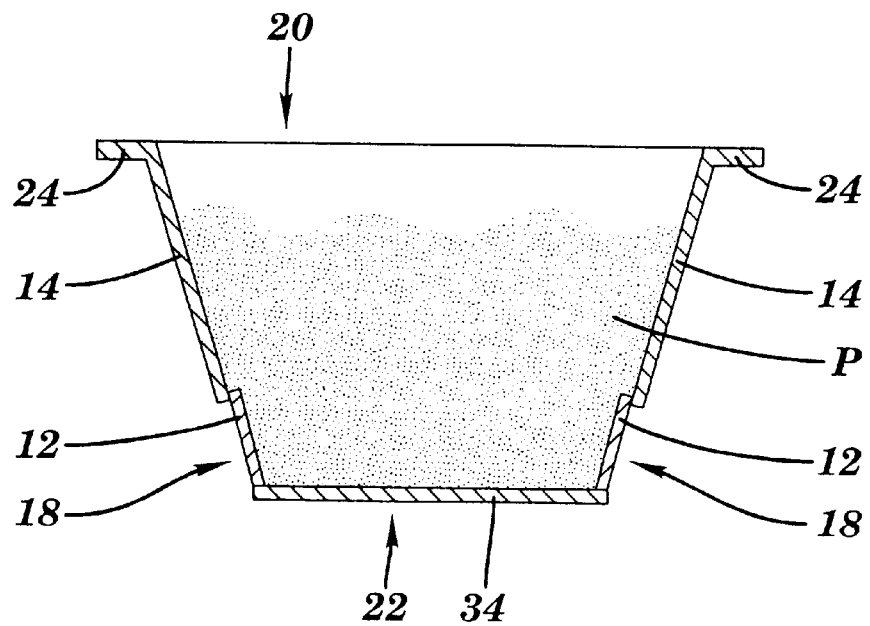
FIG. 2A is a cross-sectional, side view of the product chamber with the discharge gate in a closed position.
Figure 2B:
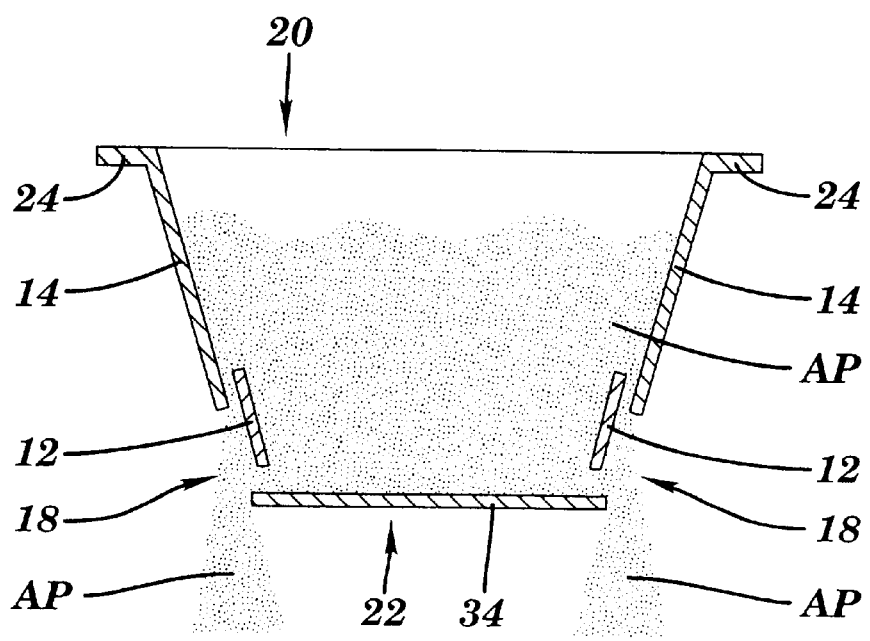
FIG. 2B is a cross-sectional, side view of the product chamber with the discharge gate in an open position.

Referring to FIGS. 1, 2A, and 2B, a discharge opening 18 is defined between and extending substantially around the outlet 32 of the duct 30 for the fluid supply system 16 and the open bottom 22 of the product chamber 14. The discharge opening 18 provides a passage for particles P to be rapidly discharged from substantially all sides of the product chamber 14. Although in this particular embodiment, the discharge opening 18 is located between the outlet 32 of the duct 30 and the open bottom 22 of product chamber 14, the discharge opening 18 could be located elsewhere, such as in the product chamber 14 adjacent the open bottom 22. If the discharge opening 18 is in the product chamber 14, then the product chamber 14, adjacent the open bottom 22, may be connected to the outlet 32 from the duct 30 for the fluid supply system 16 and the screen 34 may be connected to the product chamber 14 over the open bottom 22 rather than over the outlet 32 from the duct 30. Additionally, although in this particular embodiment one discharge opening 18 is shown, the fluid bed processing system 10 could have multiple discharge openings 18, as long as the multiple discharge openings 18 extend substantially around the product chamber 14.

One of the advantages of the present invention is that with the discharge opening 18 extending around the product chamber 14, particles P in the product chamber 14 can easily and quickly be discharged. As a result, the production throughput of the fluid bed processing system 10 can be increased because the product chamber 14 can be reloaded to start the next fluid bed processing again more quickly than with prior systems.

Referring to FIG. 1, a collection chamber 38 is connected to the product chamber 14 and is located about the discharge opening 18. The collection chamber 38 receives the particles P from the product chamber 14 when the discharge opening 18 is opened.

Referring to FIGS. 1, 2A, 2B, 4A, and 4B, the side discharge assembly 11 includes a discharge gate 12 which is mounted to the interior of the product chamber 14 and a lifting assembly 40 which can move the discharge gate 12 to a first position covering the discharge opening 18, to a second position exposing the discharge opening 18, and to intermediate positions which partially expose the discharge opening 18 and permit the rate of discharge of particles P to be controlled. Although in this particular embodiment the discharge gate 12 is located on the inside of the product chamber 14, the discharge gate 12 can be mounted at other locations, such as to the outside of the product chamber 14, as long as the discharge gate 12 can be moved to the first, second and intermediate positions. The discharge gate 12 in this particular embodiment has a funnel or ring shape which is slightly smaller than, but is the same shape as the product chamber 14, although the discharge gate 12 could have other shapes as long as it can be moved to cover and expose the discharge opening 18. Additionally, the discharge gate 12 can comprise more than one section.

Figure 4A:
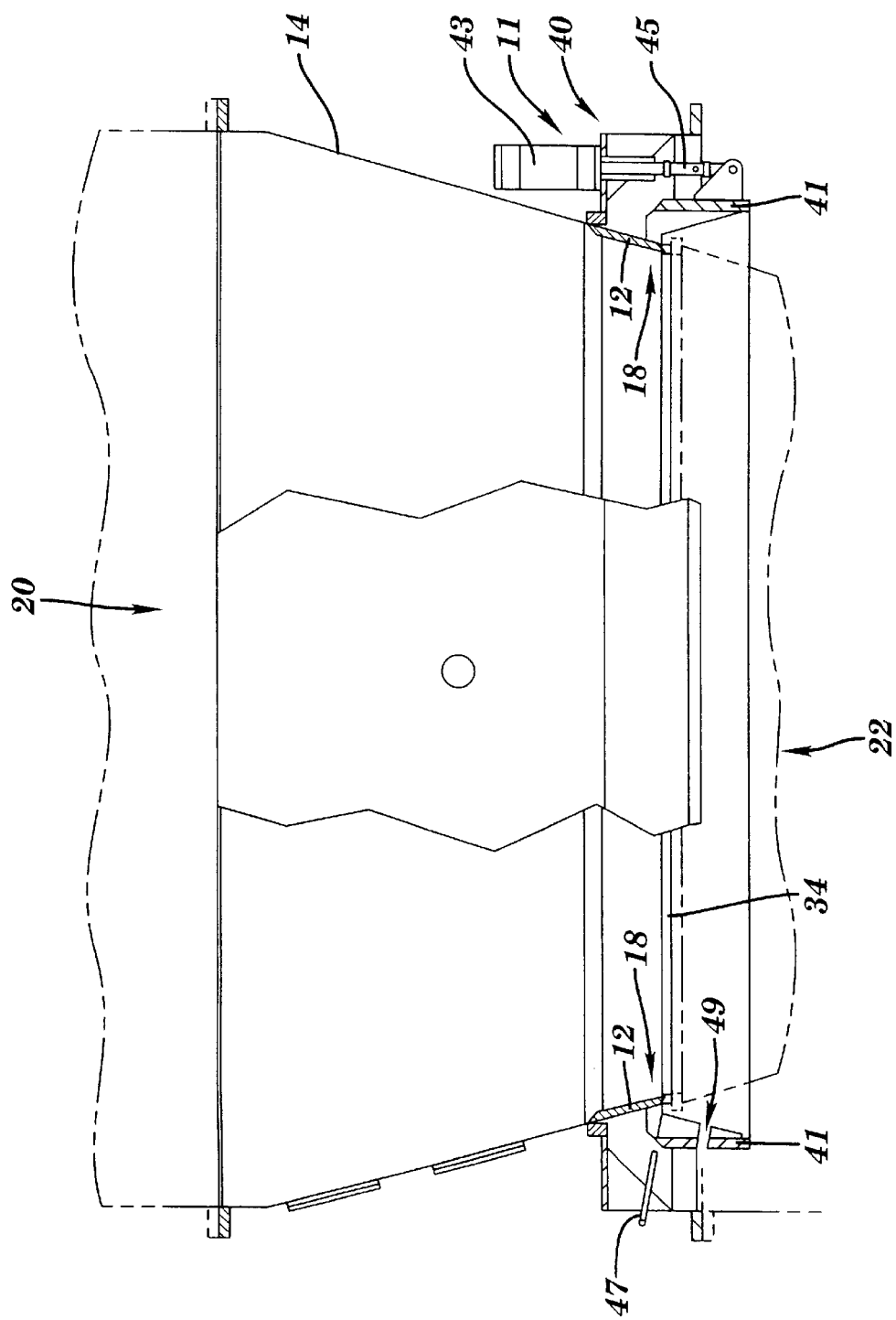
FIG. 4A is a cross-sectional view of the product chamber with a side discharge assembly including the discharge gate in a closed position.
Figure 4B:
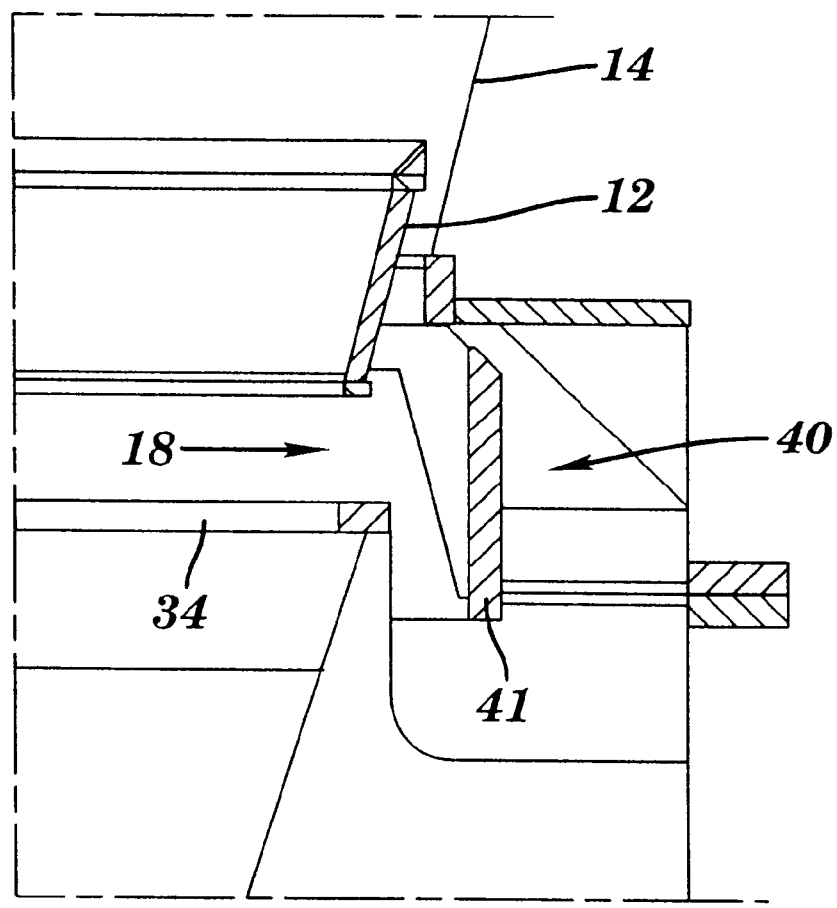
FIG. 4B is a cross-sectional view of a portion of the product chamber with a portion of the side discharge assembly including the discharge gate in an open position.

Referring to FIGS. 4A and 4B, in this particular embodiment the lifting assembly 40 includes a bracket 41 and a lift cylinder 43 with a piston 45. The bracket 41 is connected to the discharge gate 12 and to one end of the piston 45. The piston 45 is mounted for movement into and out of the lift cylinder 43. The lift cylinder 43 is secured to the outside of product chamber 14. In this particular embodiment, when the piston 45 is extended out from the lift cylinder 43, the bracket 41 moves down lowering the discharge gate 12 over the discharge opening 18. When the piston 45 is retracted back into the lift cylinder 43, the bracket moves up raising the discharge gate 12 to expose the discharge opening 18. The amount the discharge gate 12 is raised or lowered can be used to control the rate of discharge of particles P. The parts and operation of lift cylinders and their controls are well known to those of ordinary skill in the art and thus will not be described here. Although only one lifting assembly 40 is shown, the discharge gate 12 can have as many lifting assemblies 40 as needed to uniformly raise and lower the discharge gate 12. Additionally, although one particular example of a lifting assembly 40 is illustrated, any type of lifting assembly 40 which can raise and lower the discharge gate 12 can be used.

One of the advantages of the present invention is that the entire weight of the particles P does not rest upon the discharge gate 12. Instead, the discharge gate 12 simply "knifes" through a portion of the particles P along the side of the product chamber 14. As a result, a much smaller and less expensive lifting assembly 40 can be used. Additionally, with the present invention more particles P can be loaded in to the product chamber 14 for processing which increases the overall production throughput of system 10 because again the full weight of the particles P is not resting on the discharge gate 12. Small and inexpensive lift assemblies 40 can be used to move the discharge gate 12 even at the maximum capacity for particle P in the product chamber 14.

Figure 3:
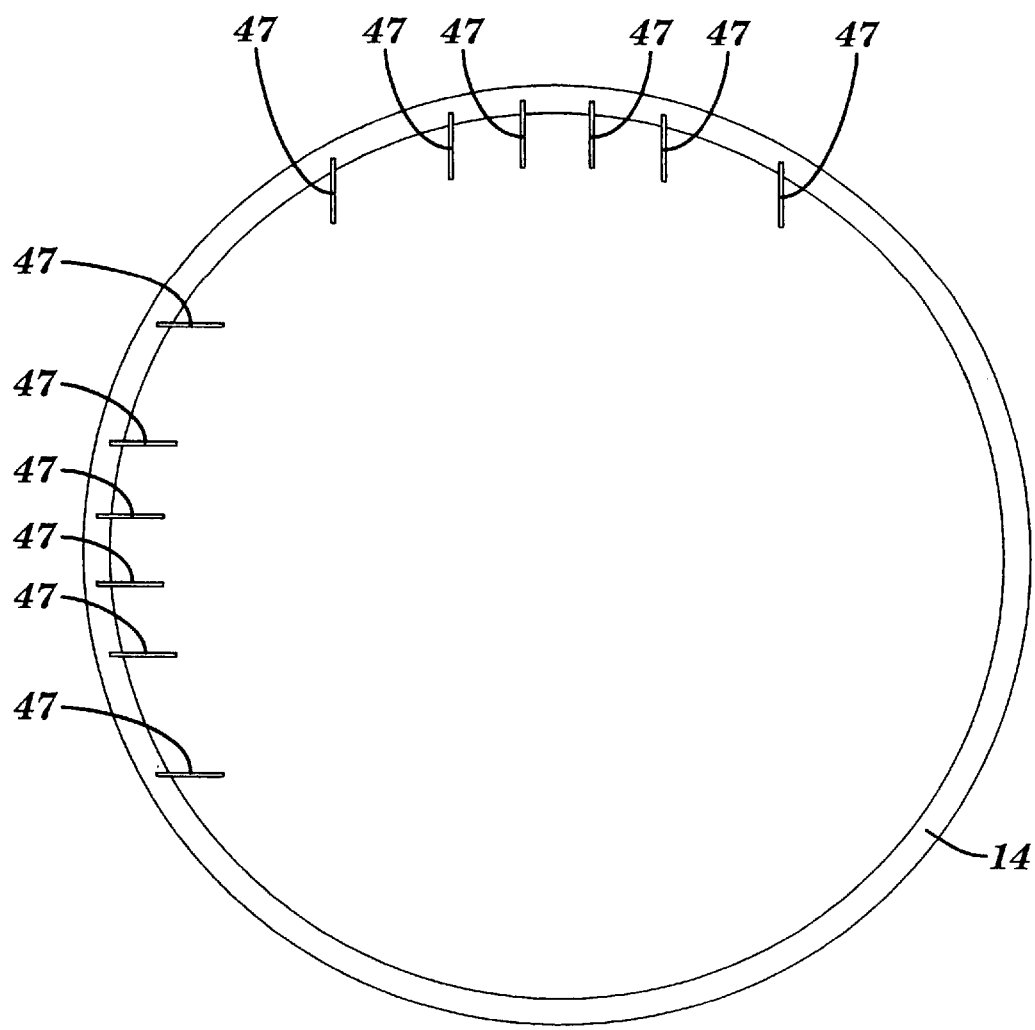
FIG. 3 is a cross-sectional, top view of the product chamber.

Referring to FIGS. 3 and 4A, in this particular embodiment the system 10 also includes a plurality of optional side jets 47. The side jets 47 are positioned around the outside of the product chamber 14 and adjacent to the discharge opening to direct a fluid, such air, towards the discharge opening 18. The components of side jets along with their supply components, such as a fluid supply system which has a reservoir of fluid connected to each of the side jets 47, and controls for the fluid supply system and side jets 47 are well known to those of ordinary skill in the art and thus will not be described in detail here. In this particular embodiment, the system 10 has twelve side jets 47 which extend partially around the product chamber 14, although the number of side jets 47 and their location can vary as needed or desired. When the discharge gate 12 is raised, an opening 49 in the bracket 41 is aligned with the outlet of the side jet 47 to permit fluid from the side jet to blow down towards the discharge opening 18 and to help guide the discharge of particles P down to the collection chamber 38.

Referring back to FIG. 1, the expansion chamber 26 has an open bottom 44 which is connected to the product chamber 14 about the open top 20. In this particular embodiment, the expansion chamber 26 has a flange 46 which extends around the expansion chamber 26 and is secured to the flange 24 of the product chamber 14 with bolts 48 or other securing devices. The expansion chamber 26 also includes an optional spray gun 50 with a spray nozzle 52 which is connected by a pipe 54 to a reservoir 56 of fluid or solution, such as a binder solution like water or an organic solvent or a coating solution. The spray nozzle 52 is positioned to spray fluid back down towards the product chamber 14 and on to the particles P which have been fluidized into the expansion chamber 26 from the product chamber 14 by the fluid supply system 16. Although only one spray gun 50 with one spray nozzle 52 is shown, the fluid bed processing system 10 may have multiple spray guns with multiple nozzles or no spray guns, as needed or desired.

A filter 58 may be connected to across the open top 60 of the expansion chamber 26. The filter 58 is used to filter out fluidized particles P in the air before the air is discharged from an open top 60 of the expansion chamber 26. An agitating mechanism (not shown) may be connected to the filter 58 to periodically shake the filter 58 to discharge captured particles P back down towards the expansion chamber 26 and product chamber 14.

Referring to FIGS. 1, 2A, 2B, 3, 4A, and 4B, one method for fluid bed processing of particles P will be discussed. First, the discharge gate 12 is moved to the first position to cover the discharge opening 18 using lift assembly 40. In this particular example, piston 45 is extended out of lift cylinder 43 to lower bracket 41 which lowers discharge gate 12. Once discharge gate 12 blocks off the discharge opening 18, particles P or other material to be processed, e.g. coated, agglomerated, or dried, are loaded into the product chamber 14. The particles P rest on the screen 34, along the inner surface of the discharge gate 12 and may rest against the inner surface of the product chamber 14 depending upon the amount of particles P loaded into the product chamber 14. Again, one of the advantages of the present invention is the use of discharge gate 12 which can knife through the particles P when moved rather than a bottom screen which must be lowered to discharge particles P and must be able to support the full weight of the particles P. As a result, since the weight of the particles P is not a concern with the present invention, more particles P can be loaded into the product chamber 14 for processing than before.

Once the particles P are loaded into the product chamber 14, the fluid supply system 16 is engaged to supply a fluid, such as air in this particular example, via the duct 30 to the particles P resting on the screen and inner surface of the discharge gate 12. The air being blown in helps to mix the particles P and enables some of the particles P to fluidize up into the expansion chamber 26. Meanwhile, the heater 36 heats the fluid being blown in to a temperature suitable for processing of particles P.

Next, if for example the particles P are to be coated or granulated, the spray gun 50 in the expansion chamber 26 is engaged to spray a solution which is stored in the reservoir 56 out of the spray nozzle 52 on to the particles P which have been fluidized. The particles P are carried up to a point in the expansion chamber 26 where they contact the fine mist of the binder solution. As the fluidized particles P are wetted, the particles P begin to descend back down. The particles P move to the lower part of the expansion chamber 26 due to increased weight. The particles P continue to go through this up and down process as they are dried and made lighter and then rewet. During this process, the filter 58 is periodically shaken to release any particles P captured by the filter 58 back down towards the expansion chamber 26 and the product chamber 14.

The spray gun 50 continues to spray solution until the particles P have been enlarged to the desired size from coatings or agglomeration. At that point, the spray gun 50 is turned off. The fluid supply system 16 continues to supply fluid up into the product chamber 14 to dry the particles P. When the desired amount of moisture or dryness for the particles P is achieved, then the fluid supply system 16 is turned off. If the particles P are merely being dried, the particles P simply descend up and down in the expansion chamber 26 as explained above until dried without any of the above-described steps relating to the spray gun 50.

The particles P accumulate in the product chamber 14 adjacent the discharge gate 12 and discharge opening 18. The lift assembly 40 is used to move the discharge gate 12 from the first position to the second or an intermediate position to at least partially expose or open the discharge opening 18. More specifically in this particular example, the piston 45 is drawn back into the lift cylinder 43 to raise bracket 41 which raises discharge gate 12. The rate of discharge can be controlled by controlling the size the discharge opening 18 is opened with the discharge gate 12. Fluid, such as air, is blown up from duct 30 and also in from side jets 47 to direct the particles out through the discharge opening 18 and down into the collection chamber 38. Since the discharge opening 18 extends substantially around the product chamber 14, the particles P can be quickly and easily removed from the product chamber 14. Once all of the particles P have been discharged from the product chamber 14, the lift assembly 40 is used to move the discharge gate 12 from the second or intermediate position to the first position to cover the discharge opening 18 by again extending piston 45 out from lift cylinder 43 which lowers bracket 41 and discharge gate 12. The product chamber 14 is now ready to receive more particles P to start the next process.

As this example illustrates, the side discharge assembly 11 is a simple and inexpensive apparatus to install and use in the fluid bed processing system 10. With the side discharge assembly 11 and the discharge opening 18 extending around the product chamber 14 to provide a large exit passage for particles P, the product chamber 14 can be rapidly emptied and refilled to begin the next production cycle which helps to increase the overall throughput of the fluid bed processing system 10.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A fluid bed processing system comprising:
   a product chamber with an open top and an open bottom;
   a fluid supply system with an outlet positioned to direct a first fluid into the product chamber, the outlet of the fluid supply system is spaced from the open bottom of the product chamber to define a discharge opening which extends substantially around the open bottom of the product chamber and the outlet of the fluid supply system the fluid supply system being fixed with respect to the product chamber;
   a product support device for supporting a product while permitting at least a portion of the first fluid to pass through, the product support device secured to the outlet of the fluid supply system; and
   a discharge gate movable to a first position covering the discharge opening and a second position exposing the discharge opening.

2. The fluid bed processing system as set forth in claim 1 wherein the discharge gate in the second position is located closer to the open top of the product chamber than in the first position.

3. The fluid bed processing system as set forth in claim 2 wherein the discharge gate in the second position is located at least partially in the product chamber.

4. The fluid bed processing system as set forth in claim 3 wherein the product chamber and the discharge gate each have a funnel shape.

5. The fluid bed processing system as set forth in claim 1 further comprising a lift assembly connected to the discharge gate which can move the discharge gate to the first and second positions.

6. The fluid bed processing system as set forth in claim 5 further comprising:
   a collection chamber connected to the product chamber and about the discharge opening; and
   at least one side jet positioned to direct fluid towards the discharge opening and the collection chamber.

7. The fluid bed processing system as set forth in claim 6 further comprising:
   an expansion chamber with an open top and an open bottom, the open bottom of the expansion chamber connected to the open top of the product chamber;
   at least one spray gun with at least one spray nozzle connected to a reservoir and extending into the expansion chamber, the spray nozzle spraying a second fluid into the expansion chamber; and
   a filter connected to the open top of the expansion chamber.

8. A fluid bed processing system comprising:
   a product chamber with an open top and an open bottom, the product chamber having at least one discharge opening adjacent the open bottom which extends substantially around the product chamber;
   a product support device for supporting a product while permitting at least a portion of a fluid to pass through into the product chamber, the product support device secured to the open bottom of the product chamber; and
   a discharge gate connected to the product chamber, the discharge gate movable to a first position covering the discharge opening and to a second position towards the open top of the product chamber which exposes the discharge opening.

9. The fluid bed processing system as set forth in claim 8 wherein the product chamber has a plurality of discharge openings which extend substantially around the product chamber.

10. The fluid bed processing system as set forth in claim 8 wherein the discharge gate in the second position is located at least partially in the product chamber.

11. The fluid bed processing system as set forth in claim 10 wherein the product chamber and the discharge gate each have a funnel-like shape.

12. The fluid bed processing system as set forth in claim 8 further comprising a lift assembly connected to the discharge gate, the lift assembly moves the discharge gate to the first and second positions.

13. The fluid bed processing system as set forth in claim 8 further comprising:
   a fluid supply system connected to the product chamber about the open bottom, the fluid supply system blowing a first fluid into the product chamber;
   a collection chamber connected to the product chamber and about the discharge opening; and
   at least one side jet positioned to direct fluid towards the discharge opening and the collection chamber.

14. The fluid bed processing system as set forth in claim 13 further comprising:
   an expansion chamber with an open top and an open bottom, the open bottom of the expansion chamber connected to the open top of the product chamber;
   at least one spray gun with at least one spray nozzle connected to a reservoir and extending into the expansion chamber, the spray nozzle spraying a second fluid into the expansion chamber; and
   a filter connected to the open top of the expansion chamber.

15. A method for fluid bed processing of particles in a fluid bed processing system with a product chamber with an open top and an open bottom, a fluid supply system with an outlet positioned to direct a fluid into the product chamber, a product support device for supporting a product while permitting at least a portion of the fluid to pass through, the product support device is connected to the outlet of the fluid supply system, the method comprising:
   moving a discharge gate to a first position covering a discharge opening which extends substantially around and between the open bottom of the product chamber and the outlet of the fluid supply system, the fluid supply system remaining fixed with respect to the product chamber;
   processing the particles; and
   moving the discharge gate to a second position to expose the discharge opening and to permit discharge of the particles from the product chamber, the fluid supply system remaining fixed with respect to the product chamber.

16. The method as set forth in claim 15 wherein the step of processing the particles comprises:

fluidizing the particles in the product chamber with the fluid from the fluid supply system; and spraying a solution on the fluidized particles.

17. The method as set forth in claim 15 wherein the discharge gate is located closer to the open top of the product chamber in the second position than in the first position.

18. The method as set forth in claim 15 wherein the discharge gate in the second position is located at least partially in the product chamber.

19. A method for fluid bed processing of particles in a fluid bed processing system with a product chamber with an open top and an open bottom and a fluid supply system with an outlet positioned to direct a fluid into the product chamber, a product support device for supporting a product while permitting at least a portion of the fluid to pass through, the product support device is connected to the outlet of the fluid supply system, the method comprising:

moving a discharge gate to a first position covering a discharge opening which is located in and which extends substantially around the product chamber, the fluid supply system remaining fixed with respect to the product chamber;

processing the particles; and moving the discharge gate to a second position to expose the discharge opening and to permit discharge of the enlarged particles from the product chamber, the fluid supply system remaining fixed with respect to the product chamber.

20. The method as set forth in claim 19 wherein the step of processing the particles comprises:

fluidizing the powder in the product chamber with the fluid from the fluid supply system; and spraying a solution on the fluidized particles.

21. The method as set forth in claim 19 wherein the discharge gate is located closer to the open top of the product chamber in the second position than in the first position.

22. The method as set forth in claim 19 wherein the discharge gate in the second position is located at least partially in the product chamber.

\* \* \* \* \*